United States Patent [19]

Zutten et al.

[11] Patent Number: 5,482,757
[45] Date of Patent: Jan. 9, 1996

[54] TARPAULIN PROTECTOR

[76] Inventors: Martin P. Zutten; Beverly J. Zutten, both of 8521 SW. 45th St., Topeka, Kans. 66610

[21] Appl. No.: 28,800

[22] Filed: Mar. 5, 1993

[51] Int. Cl.⁶ .................................................. B60P 7/04
[52] U.S. Cl. ............................ 428/100; 24/3.13; 24/3.1; 24/301; 24/459; 296/100; 428/77; 428/101; 428/212; 428/220
[58] Field of Search ........................... 428/100, 99, 101, 428/212, 220, 77; 24/459, 301, 3 R, 3 M; 248/345.1; 296/100; 206/586, 453; 229/DIG. 1; 119/96, 106; 294/149, 150, 157; 2/338, 112, 60, 129, 133

[56] References Cited

U.S. PATENT DOCUMENTS

| | | | |
|---|---|---|---|
| 706,464 | 8/1902 | Spurgin | 428/100 |
| 1,014,196 | 1/1912 | Williamson | 224/197 |
| 1,639,472 | 8/1927 | Silberman | 428/100 |
| 1,648,736 | 11/1927 | Marcus | 428/100 |
| 1,763,540 | 6/1930 | Rocke | 428/100 |
| 3,848,271 | 11/1974 | Goele | 2/338 |

*Primary Examiner*—Nasser Ahmad
*Attorney, Agent, or Firm*—Bruce J. Clark

[57] ABSTRACT

A tarp protector for use in the shipping industry is disclosed, comprised of an elongated sheet of webbing, metal rings at either end affixed to the webbing with a plurality spaced apart rings there between, male-female releasable connecting means attached to each end respectively to allow extensions, and retractable protective flaps permanently affixed to the webbing and covering the rings and connecting means.

6 Claims, 3 Drawing Sheets

TARPAULIN PROTECTOR

BACKGROUND OF INVENTION

This invention relates to the protection of tarpaulins used in the over-the-road and other shipping industries.

It is common in the shipping industry, whether by truck, rail or other carrier, to use tarpaulins to cover the load for the purpose of protecting and/or concealing the load. Because of the sharp corners, edges or other objects on these loads, and due to the constant driving wind blowing the tarp against these corners during shipment, the tarpaulins tend to wear out relatively quickly, with the first tear or hole usually occurring at the points of friction against the loads. These tarps are expensive and one trailer alone can utilize several tarps in any one year. Consequently, it is an object of this invention to provide a relatively inexpensive, durable and universal tarp protector.

There is no prior art known to these inventors, there being no tarp protectors. The closest art in the shipping business relates to inventions that protect the load rather than the tarp, or that are for securing the load. The present invention is not a securing device and in fact should not be used as a securing device.

Thus presented in the present invention is an elongated sheet of heavy webbing type material (including rubberized material) having male and female connections at either end to allow extensions of the invention to be added for larger loads, with spaced apart metal rings secured to the webbing, and protective webbing flaps affixed to the webbing to cover each of the rings and protect the load from the rings and connectors. A rubber or spring-loaded hook or other securing means, then is used to secure the nylon webbing to the truck bed using the appropriate ring at either end of the invention once the invention is thrown over the load and placed over the sharp corners.

Other objects and features of the invention and objective and the manner in which the invention achieves its purpose will be appreciated from the foregoing in the following description and the accompanying drawings which exemplify the invention, it being understood that changes may be made in the specific invention disclosed herein without departing from the essentials of the invention set forth in the intended claims.

BRIEF SUMMARY OF THE INVENTION

The present invention is a tarp protector for use in the shipping industry. The invention is comprised of an elongated webbing having rings at either end and spaced apart rings in between all securely affixed to the webbing with releasable male-female connecting means to allow additional extensions of the invention, and further having protective flaps affixed to the invention and covering the rings and connecting means.

DESCRIPTION OF THE PREFERRED EMBODIMENT

Figure 1:
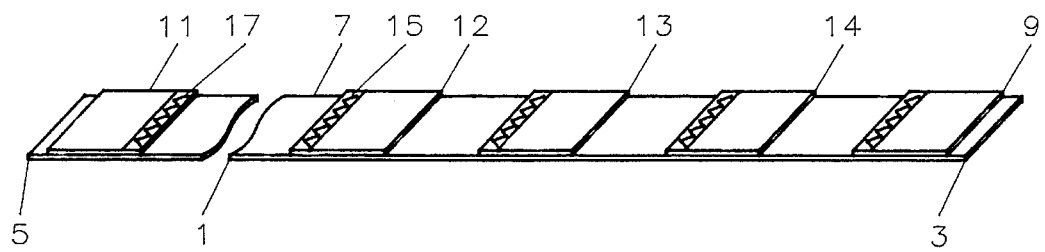
FIGS. 1 and 2 are side views of the invention.
Figure 2:
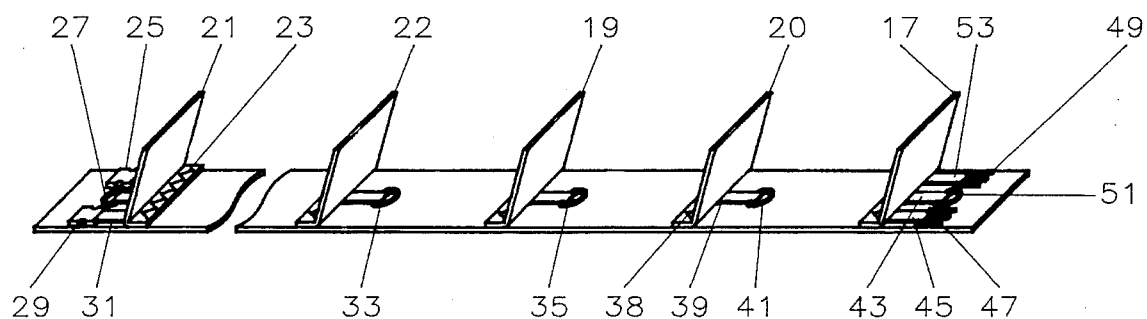

FIG. 1 depicts the invention. FIG. 2 depicts the same invention with the flaps up.

More specifically, the invention in its preferred embodiment is comprised of an elongated sheet of thick, durable, flexible material, which will be referred to and define the term "webbing" as used herein. The webbing can be nylon type cord webbing, similar to fire hose type of material, or any rubberized material that is sufficiently strong to withstand the forces of friction attempted to be protected from as described herein. The webbing in its preferred mode is at least three inches in width. The length from one end to the other is of sufficient length to reach across the bed of the truck or trailer and over the minimum load expected.

The protector flaps 11, 12, 13, 14, and 9 (shown also in FIG. 2 as correspondingly 21, 22, 19, 20, 17) are comprised of similar type webbing as protectors covering the rings and connectors discussed hereafter. These protector flaps are connected on at least one side 17 with stitching so as to be permanently and securely affixed to the webbing 1. These flaps are thus normally closed but are flexible and may be lifted easily to allow access to the rings and connectors. They protect the load so as not to allow the rings and connectors to damage the paint or surface thereon. In the preferred mode, the flaps are made of the same webbing as the elongated sheet 1. However, the flaps may be made of any thick, durable and protective material sufficient to protect the load from the rings and connectors underneath in the expected severe wind conditions and movement expected during shipment. The flaps are of sufficient size to cover the ring or connecting device underneath.

The rings 27, 33, 35, 41, and 51 in the preferred mode are comprised of metal rings, however, any hook receiving device will suffice. In the preferred mode they are spaced apart throughout from one end of the webbing 5 and the other 3. Although it is not necessary, they are in the preferred mode spaced apart in equal distances approximately 18 inches apart except between ring 33 and 27, wherein the rings are unnecessary for one full truck bed length (at 7) given that no attaching ring will be necessary throughout that length. In general, however, the rings are spaced apart throughout the length.

The rings can be any receiving means or other attachment means to allow the rope or hook connector to connect from the truck bed to the respective ring. However, in the preferred mode, the rings are permanently and securely attached to the webbing 1 via a strap 39 stitching to the webbing.

At either end of the strap are attached not only the rings 51 and 27 in FIG. 2, but also end-connecting means 47, 49 and 25, 29. These are also shown in FIG. 3 and 4 in more detail as follows.

Figure 3:
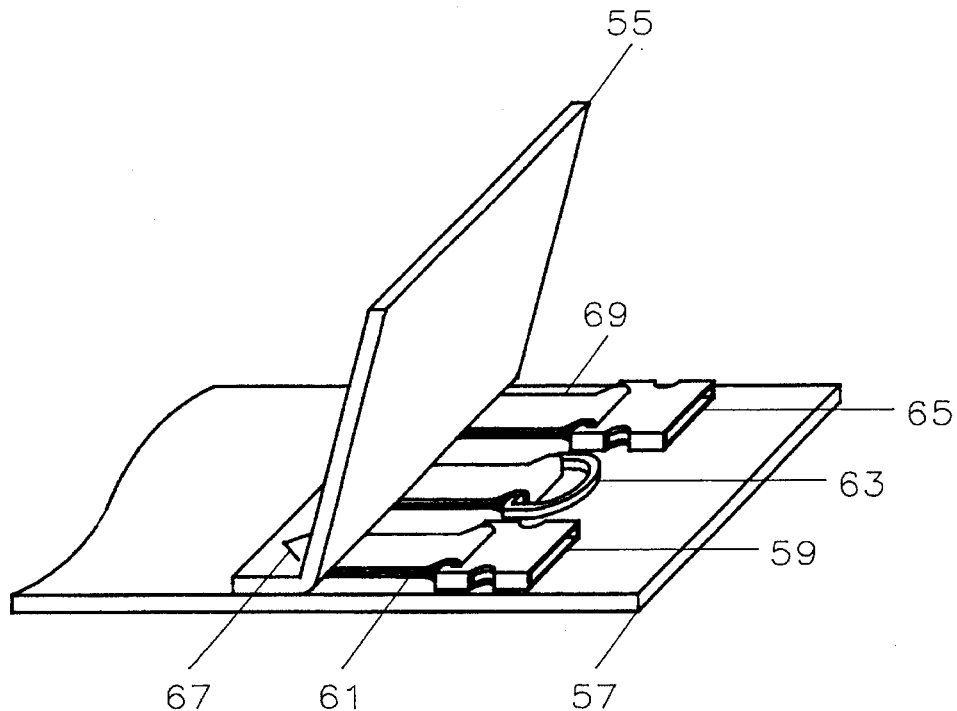
FIG. 3 depicts one end of the invention shown as 3 in FIG. 1.

Referring to FIG. 3, a pair of female receiving connecting means 59 and 65 attached to the webbing straps 61 and 69 are stitched along with the flap 55 to the webbing at stitch 67. In between the two female connectors is the ring 63 referred to above. Although the flap 55 is shown open as the flaps are shown in FIG. 2, the flap is semi-rigid, but flexible in a normally down mode; lifting the flap allows access to the connecting means and rings underneath.

Figure 4:
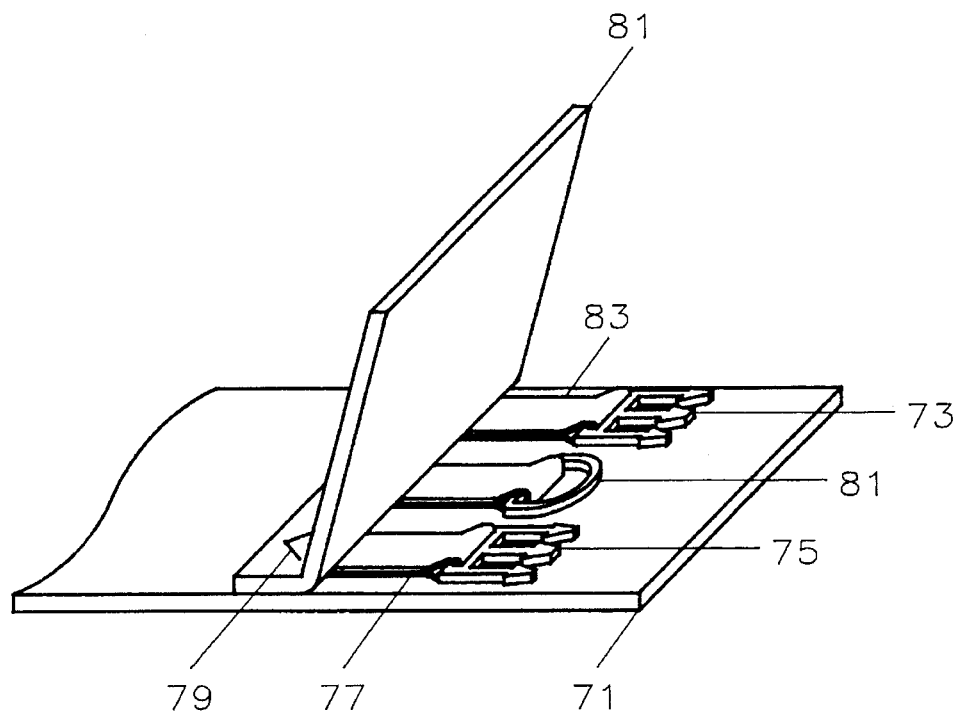
FIG. 4 depicts the other end of the invention shown as 5 in FIG. 1.

FIG. 4 shows the opposing end (corresponding to end 5, FIG. 1) having a pair of male connectors 73 and 75 that correspond and fit into the female connectors 57 and 65. Male connectors 73 and 75 are similarly permanently affixed to the webbing via straps 77 and 83, 79 and protector flap 81. In between the two male connectors is the ring 81 corresponding to the ring 27 in FIG. 2.

The releasable connecting means via connectors 57, 65, 73, 75, can be any releasable connecting means. The ones shown in FIG. 3 and 4 are available plastic male-female connectors that work reliably and conveniently and are also sturdy and rugged. The invention however is not in anyway a securing device for securing the load and these connection devices are not intended to be sufficient to withstand anything other than the purpose of connecting numerous inventions together end-to-end so at to allow the extension of the invention as needed, depending on the size of the load. The larger the load, the more extensions needed and they will thus conveniently and easily attach end-to-end to each other via these connecting devices.

Although it is not required that there be a pair of connecting devices at each end, the invention works best in this manner. Other connecting devices and methods are envisioned. It only be required that the ends be releasably connecting together.

Figure 5:
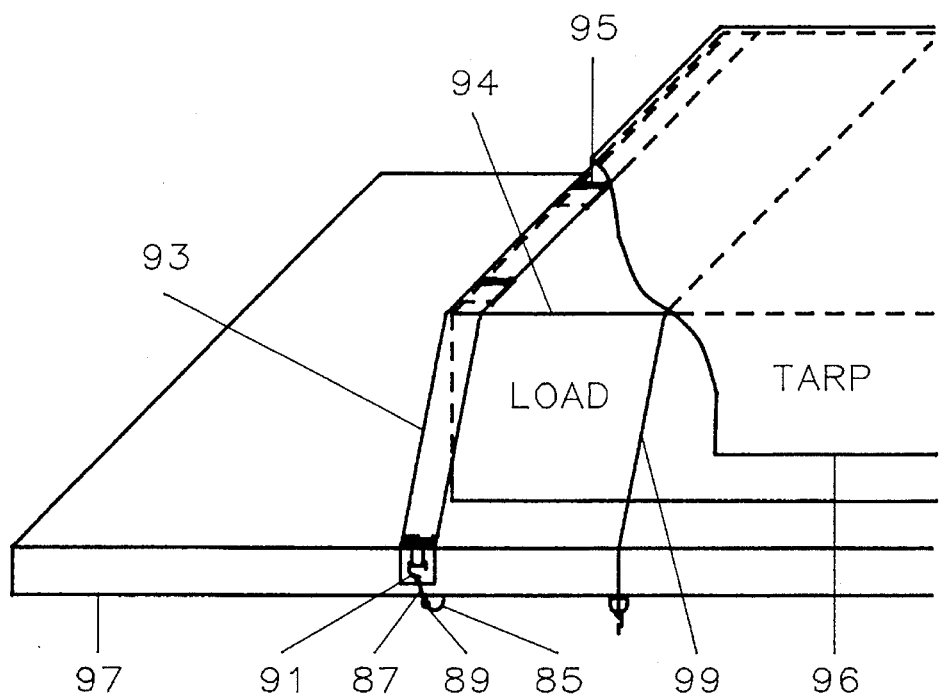
FIG. 5 shows the invention in use and in place.
Figure 6:
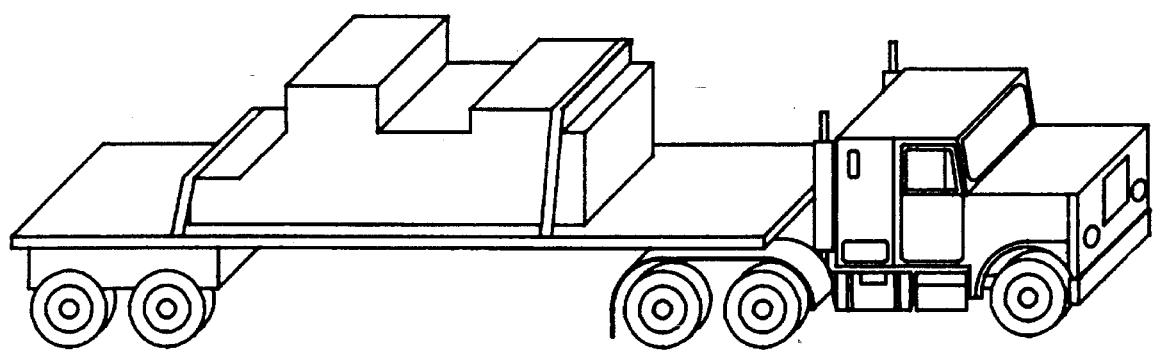
FIG. 6 also depicts the invention in use and in place.

To utilize the invention, as shown in FIG. 5 and 6, the invention is attached to the bed of the truck via a rope or other connecting mechanism. In the preferred mode, a commonly available connecting device 87, having a hook on either end and strong rubber in between serves the purpose of holding the invention 93 taut over the load. The hook 89 is thus secured to a portion of the truck bed trailer, usually a metal eye loop 85 or some similar truck bed hook receiving mechanism. The other end of the device 87 is hooked through the ring 91 of the invention 93. The invention is then thrown over the top of the load and placed over the respective corner 94 and the other corners in between. On the opposing side, the invention then is pulled taut and is connected to the other side of the truck bed with a hook similar to the device 87 between the truck bed trailer and the closest available ring on the invention 93. If an extra extension is needed to reach over the load, one is simply added using the releasable end-connecting means. Thus an unlimited length may be provided. Additional inventions are often needed throughout the load depending on the number of sharp corners and edges that need to be protected.

The invention is also shown in FIG. 6 in use on the truck bed trailer.

It should be noted that any securing lines such as 99, are already in place and secure the load before the placement of the invention over the sharp corners and edges. Once the securing line 99 is in place and the sharp corners and edges are covered with the invention, the tarp 96 is then pulled over the invention and secured. Thus there is provided a tarp protector that when completed, can be rolled up, stored away easily, is convenient, relatively inexpensive, durable and can protect the expensive tarps from excessive wear and tear.

While there have been shown and described particular embodiments of the invention, it will be obvious to those skilled in the art that changes and modification may be made without departing from the invention or its equivalent and, therefore, it is intended by the appended claims to cover all such changes and modifications as fall within the true spirit and scope of the invention.

We claim:

1. A tarpaulin protector for use in shipping comprised of:
  a. Elongated webbing having two opposing ends;
  b. A plurality of longitudinally spaced-apart, hook-receiving means attached to the webbing;
  c. A plurality of retractable covering means, each of said covering means attached to the webbing covers one of said hook-receiving means that can be retracted to allow access to the hook-receiving means.

2. A tarpaulin protector for use in shipping comprised of:
  a. Elongated webbing having two opposing ends;
  b. A plurality of longitudinally spaced-apart, hook-receiving means attached to the webbing;
  c. A plurality of retractable covering means, each of said covering means attached to the webbing covers one of said hook-receiving means that can be retracted to allow access to the hook-receiving means;
  d. Releasable end connecting means attached to each end of the webbing so as to allow the two ends to releasably connect together.

3. A tarpaulin protector for use in shipping comprised of:
  a. Elongated webbing having two opposing ends;
  b. A plurality of longitudinally spaced-apart, hook-receiving means attached to the webbing;
  c. Releasable end connecting means attached to each end of the webbing so as to allow the two ends to releasably connect together;
  d. Retractable covering means attached to the webbing for covering the hook-receiving means and end-connecting means and that can be retracted to allow access to the hook-receiving means and end-connecting means.

4. A tarpaulin protector for use in shipping comprised of:
  a. An elongated webbing at least three inches in width having two opposing ends;
  b. A plurality of longitudinally spaced-apart rings attached to the webbing;
  c. Releasable end-connecting means attached to each end of the webbing allowing for releasably connecting the two ends together;
  d. Retractable, flexible protector flaps to cover the rings and the end-connecting means, each flap having four sides and of a sufficient size to cover the respective rings and end-connecting means, attached to the webbing on one side so as to allow the flap to cover the respective ring and end-connecting means yet so as to allow lifting of the flap to provide access to the respective ring and end-connecting means.

5. The tarpaulin protector in claim 4 wherein the releasable end-connecting means is comprised of a pair of female connectors attached to the webbing at one end and a pair of corresponding male connectors attached to the webbing at the opposing end.

6. The tarpaulin in claim 5 wherein a ring is affixed between the respective pair of connectors at each end of the webbing.

* * * * *